(12) United States Patent
Hethcock et al.

(10) Patent No.: US 8,540,453 B2
(45) Date of Patent: Sep. 24, 2013

(54) APPARATUS FOR JOINING MEMBERS AND ASSEMBLY THEREOF

(75) Inventors: James D. Hethcock, Colleyville, TX (US); Rodney H. Jones, Grapevine, TX (US); Carl A. May, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 853 days.

(21) Appl. No.: 11/909,135

(22) PCT Filed: Mar. 23, 2006

(86) PCT No.: PCT/US2006/010692
§ 371 (c)(1),
(2), (4) Date: Sep. 19, 2007

(87) PCT Pub. No.: WO2006/102566
PCT Pub. Date: Sep. 28, 2006

(65) Prior Publication Data
US 2009/0232591 A1   Sep. 17, 2009

Related U.S. Application Data

(60) Provisional application No. 60/664,577, filed on Mar. 23, 2005.

(51) Int. Cl.
*F16B 11/00* (2006.01)
(52) U.S. Cl.
USPC ............................ 403/265; 403/166; 403/220
(58) Field of Classification Search
USPC ................ 403/262, 166, 220, 265; 52/167.1; 188/268
See application file for complete search history.

(56) References Cited

U.S. PATENT DOCUMENTS 2,943,870 A   7/1960 Davis
3,424,064 A   1/1969 Valentine
(Continued)

FOREIGN PATENT DOCUMENTS

CN   1100213 C   5/1996
EP   442134 A1   8/1991
(Continued)

OTHER PUBLICATIONS

Supplementary European Search Report in EP counterpart application No. 06748620.9, issued by European Patent Office, Apr. 19, 2010.
Richou, Jean Claude, Les Chroniques Du Cated, XP-002130545, Jun. 1, 1976, vol. 2, No. 6., Paris, France.

(Continued)

*Primary Examiner* — Victor MacArthur
(74) *Attorney, Agent, or Firm* — James E. Walton; J. Oliver Williams

(57) ABSTRACT

An apparatus for joining a first member and a second member includes means for joining the first member and the second member, means for transferring shear loads between the first member and the second member separate from the means for joining the first member and the second member, and means for providing a compression preload to the means for transferring shear loads between the first member and the second member. An assembly includes a first member, a second member, and means for joining the first member and the second member. The assembly further includes means for transferring shear loads between the first member and the second member separate from the means for joining the first member and the second member and means for providing a compression preload to the means for transferring shear loads between the first member and the second member.

4 Claims, 10 Drawing Sheets

(56) References Cited

U.S. PATENT DOCUMENTS

| | | | |
|---|---|---|---|
| 3,490,796 | A | 1/1970 | Smith, Jr. |
| 3,605,953 | A * | 9/1971 | Caldwell ................. 188/268 |
| 5,439,306 | A | 8/1995 | Lhernould |
| 6,074,506 | A | 6/2000 | Herring, Jr. et al. |
| 6,083,604 | A | 7/2000 | Haraga et al. |
| 6,589,666 | B1 | 7/2003 | Herder et al. |
| 2002/0041482 | A1 | 4/2002 | Sun et al. |
| 2002/0076269 | A1 | 6/2002 | Schwarzbich |
| 2003/0225311 | A1 | 12/2003 | Sayet et al. |
| 2004/0187289 | A1 | 9/2004 | Toback |

FOREIGN PATENT DOCUMENTS

| | | | |
|---|---|---|---|
| JP | 52015958 | A | 2/1977 |
| JP | 2000034847 | A | 2/2000 |
| JP | 2009276970 | A | 11/2009 |
| RU | 1803616 | A1 | 3/1993 |
| RU | 1808001 | A3 | 4/1993 |
| SU | 146331 | | 8/1961 |
| SU | 501439 | A1 | 1/1976 |
| SU | 509731 | A2 | 4/1976 |
| SU | 676770 | A1 | 7/1979 |
| SU | 817341 | A1 | 3/1981 |
| SU | 870776 | A1 | 10/1981 |
| SU | 988198 | A3 | 1/1983 |

OTHER PUBLICATIONS

Office Action in RU counterpart application No. 2007138343/11(041938), issued by Patent Office of the Russian Federation, Federal Institute of Industrial Property, Mar. 19, 2009.

Canadian Office Action in Canadian counterpart application No. 2,601,231, issued by Canadian Intellectual Property Office, Jul. 19, 2010.

Office Action in CN counterpart application No. 200680009124(041938), issued by Patent Office of China, Oct. 9, 2009.

Office Action in CN counterpart application No. 2,601,231, issued by Canadian Intellectual Property Office, Sep. 21, 2009.

Chinese Office Action in Chinese counterpart application No. 200680009124.X, issued by Chinese Patent Office, Dec. 21, 2010.

US 5,776,584, 07/1998, Haraga et al. (withdrawn).

European Office Action in European counterpart application No. 06748620.9, issued by European Patent Office, Mar. 29, 2011.

Japanese Office Action in Japanese counterpart application No. 2008-503208, issued by Japanese Patent Office, Apr. 5, 2011, two (2) pages.

European Office Action in European counterpart application No. 06748620.9, issued by European Patent Office, Dec. 7, 2011.

Indian Office Action in related Indian patent application No. 3557/KOLNP/2007, 16 pages, mailed Jan. 28, 2013.

* cited by examiner

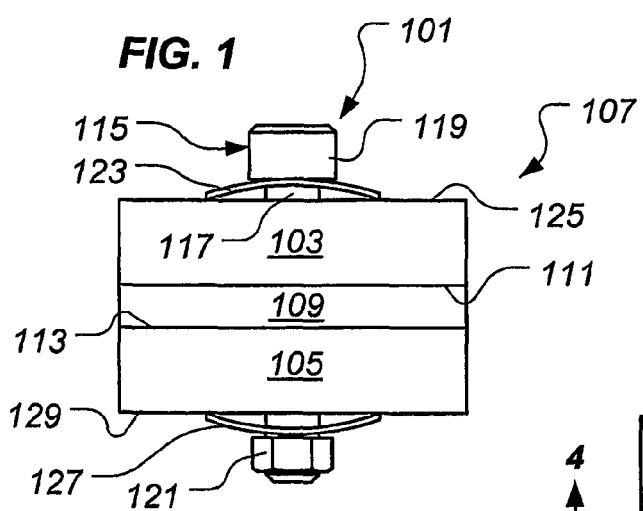
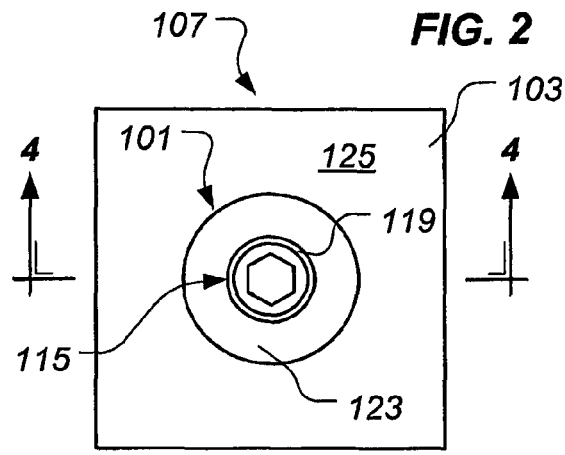
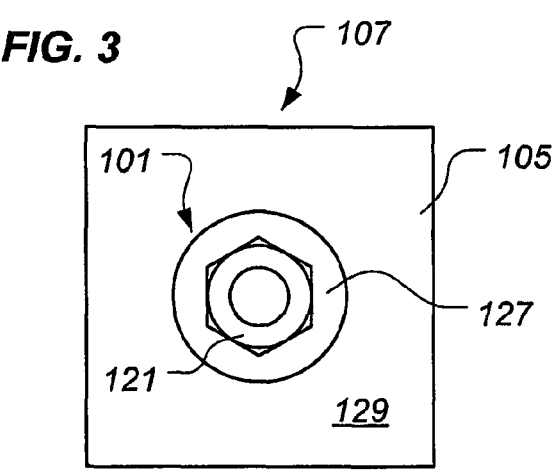
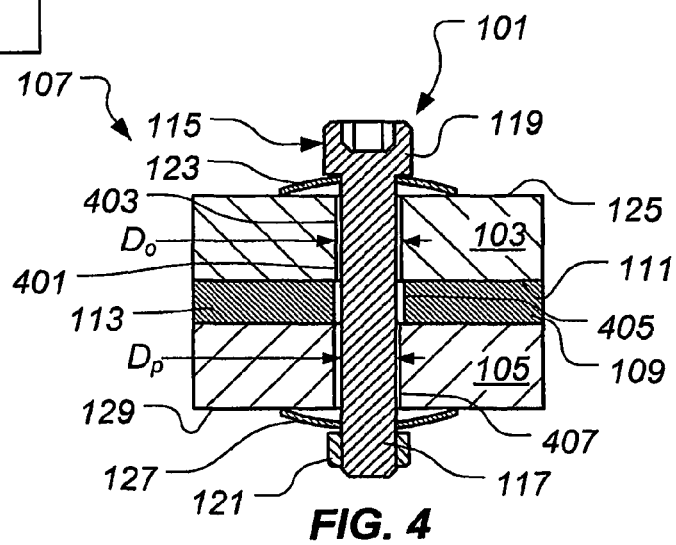
FIG. 1
FIG. 2
FIG. 3
FIG. 4

FIG. 11
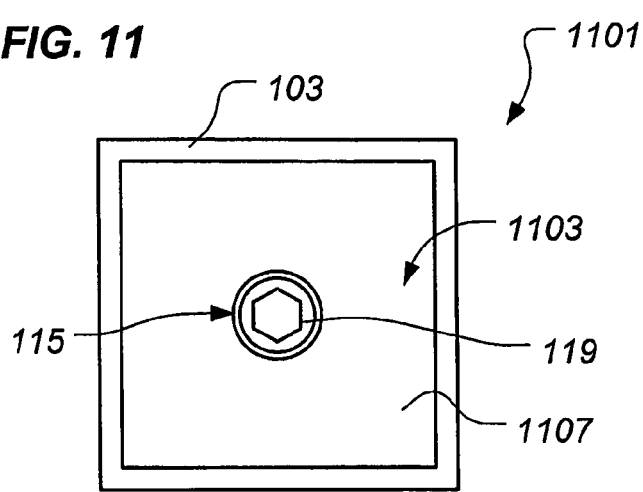
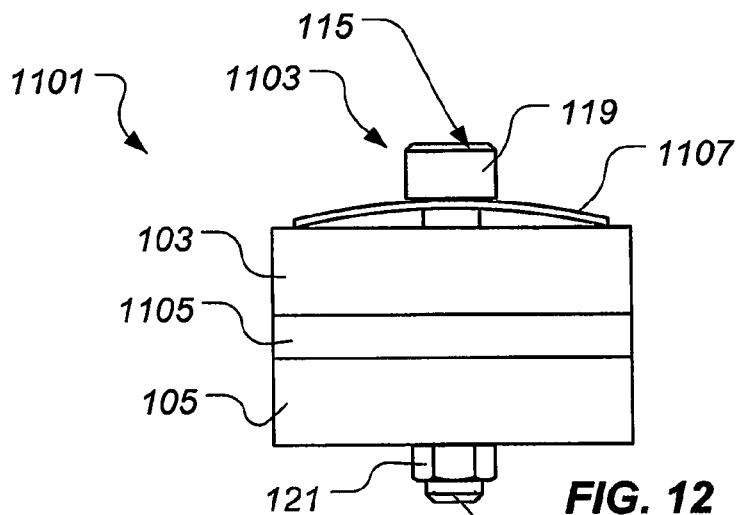
FIG. 12
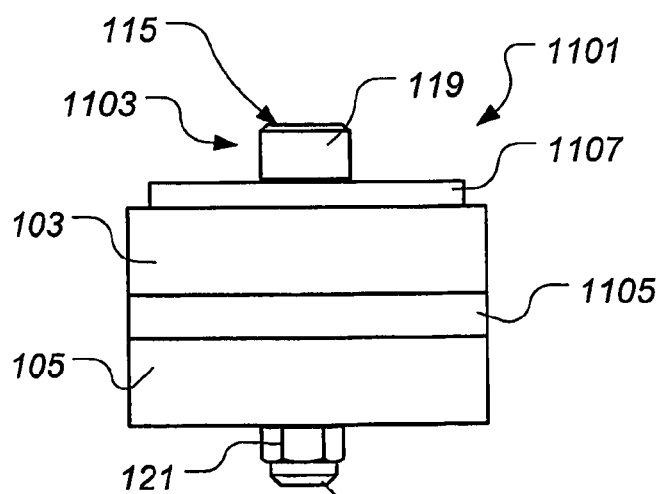
FIG. 13

APPARATUS FOR JOINING MEMBERS AND ASSEMBLY THEREOF

CROSS-REFERENCE TO RELATED APPLICATIONS

This application claims priority to U.S. Provisional Application No. 60/664,577 by Hethcock et al. filed 23 Mar. 2005, entitled "Advanced Bonded Compression Joint," which is incorporated herein by reference for all purposes.

TECHNICAL FIELD

The present invention relates in general to the field of mechanically-joined structural assemblies.

DESCRIPTION OF THE PRIOR ART

It is desirable for a structural assembly to efficiently transfer loads (e.g., shear loads) across one or more joints between components of the assembly. Furthermore, in many structures it is preferred that the loads be substantially uniformly transferred through the entire structure. Failure to efficiently and uniformly transfer loads often results in a structure being subjected to stresses concentrated in localized portions of the structure. Such concentrated, localized stresses may exceed the design criteria for the structure, even though the overall loading on the structure is within design criteria.

It is particularly desirable for a structural assembly that includes one or more adhesively bonded joints to efficiently transfer loads, especially shear loads, across the bonded joints. If the adhesive bond fails due to concentrated stresses in a particular portion of the bond, loads will no longer be efficiently transferred between the members joined by the adhesive bond. As a result, adhesively bonded primary structure is disregarded from consideration in many applications, such as aircraft applications.

Moreover, it is desirable for fastener openings or holes to be generated in parts at a detail fabrication stage, rather than being match-drilled as the parts are being assembled. Conventional manufacturing methods used to drill fastener holes during the detail fabrication stage often result in the holes being angularly and/or linearly mismatched when the parts are assembled. Match-drilling is an expensive process that requires additional tooling and substantial time during the assembly stage, thus unfavorably impacting product manufacturing flow and cost.

There are many designs of structural assemblies including bolted-bonded joints well known in the art; however, considerable room for improvement remains.

SUMMARY OF THE INVENTION

There is a need for an improved apparatus for joining members.

Therefore, it is an object of the present invention to provide an improved apparatus for joining members and an improved assembly incorporating the apparatus.

In one aspect, the present invention provides an apparatus for joining a first member and a second member. The apparatus includes means for joining the first member and the second member, means for transferring shear loads between the first member and the second member separate from the means for joining the first member and the second member, and means for providing a compression preload to the means for transferring shear loads between the first member and the second member.

In another aspect of the present invention, an assembly is provided. The assembly includes a first member, a second member, and means for joining the first member and the second member. The assembly further includes means for transferring shear loads between the first member and the second member separate from the means for joining the first member and the second member and means for providing a compression preload to the means for transferring shear loads between the first member and the second member.

In yet another aspect, the present invention provides an assembly, including a first member, a second member, and a joining element joining the first member and the second member. The assembly further includes a shear load transfer structure operably associated with the first member and the second member separate from the joining element, and a compression preload feature providing a compression preload to the shear load transfer structure.

The present invention provides significant advantages, including: (1) providing lightweight bolted-bonded structural attachments with enhanced strength and reliability; (2) flexibility at assembly; (3) allowance for in-plane mismatch of structural components while the selection of thickness and stiffness of the variable stiffness elements permit gap and angular mismatch of structural components while retaining the original overall joint stiffness, resulting in consistent joint performance with reduced assembly time and manufacturing costs; and (4) improvements in static and fatigued performance with a weight and cost savings over conventional bolted joints with machined step structure or conventional bonded joints.

Further objects and advantages of this invention will become apparent from a consideration of the drawings and ensuing description.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a side, elevational view of a first illustrative embodiment of an assembly according to the present invention, in which an apparatus for joining members of the assembly is in an uncompressed state;

FIG. 2 is a top, plan view of the assembly of FIG. 1;

FIG. 3 is a bottom, plan view of the assembly of FIG. 1;

FIG. 4 is a cross-sectional view of the assembly of FIG. 1, taken along the line 4-4 of FIG. 2;

FIG. 11 is a top, plan view of a third illustrative embodiment of an assembly of the present invention depicting an embodiment of a biasing element alternative to that of FIG. 1, wherein the apparatus for joining the members is in an uncompressed state;

FIG. 12 is a side, elevational view of the assembly of FIG. 11;

FIG. 13 is a side, elevational view of the assembly of FIG. 11, illustrating the apparatus for joining members in a compressed state;

Figure 5:
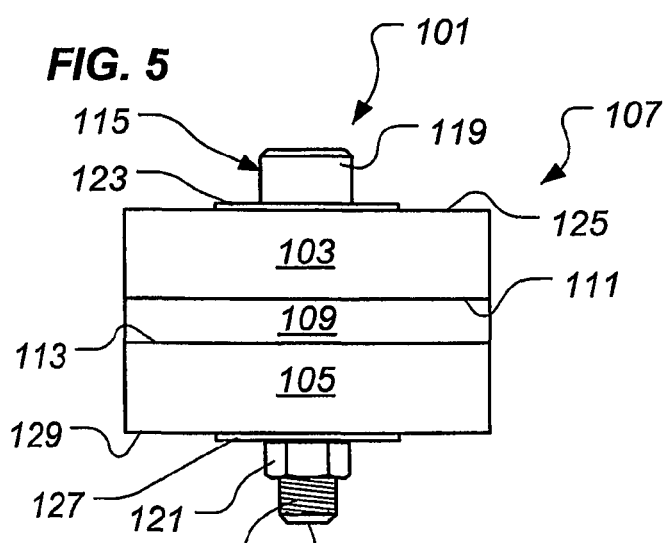
FIG. 5 is a side, elevational view of the assembly of FIG. 1, wherein the apparatus for joining the members of the assembly is in a compressed state.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents an apparatus for joining a first member and a second member, an assembly resulting from the joining of the first member and the second member, and a method for making the assembly. The apparatus includes a means for joining the first member and the second member and a means for transferring a shear load between the first member and the second member that is separate from the means for joining the first member and the second member. The apparatus further includes a means for providing a compression preload to the means for transferring the shear load between the first member and the second member.

In one embodiment, the means for joining the first member and the second member is one or more mechanical fasteners. The mechanical fasteners may be, for example, integral with the first member and/or the second member. Alternatively, the mechanical fasteners may be separate elements, such as bolts, rivets, or the like. Such examples are merely representative of the means encompassed by the present invention for joining the first member and the second member.

The means for transferring the shear load between the first member and the second member may be integral with one or both of the first member and the second member. For example, the means for transferring the shear load may be a feature of the first member and/or the second member, such as one or more knurled features. The means for transferring the shear load instead, or in addition to, may be a separate component attached to the first member and the second member, such as an adhesive layer, a shear transfer adhesive layer, or a shear transfer layer adhesively bonded to the first member and the second member. Such examples, however, are merely representative of the means encompassed by the present invention for transferring the shear load between the first member and the second member.

The means for providing a compression preload to the means for transferring the shear load between the first member and the second member may be integral with one or both of the first member and the second member. For example, the means for providing the compression preload may be accomplished by bending one or both of the first member and the second member from a first configuration or position to a second configuration or position. Biasing elements, such as Belleville washers or the like, may also be employed as the means for providing the compression preload. Such examples, however, are merely representative of the means encompassed by the present invention for providing the compression preload to the means for transferring the shear load between the first member and the second member.

FIGS. 1-6 depict various views of a first illustrative embodiment of an apparatus 101 according to the present invention for joining a first member 103 and a second member 105 to produce an assembly 107. It should be noted that particular configurations of first member 103 and second member 105, illustrated in FIGS. 1-6, are merely exemplary. The scope of the present invention encompasses any desired configurations of first member 103 and second member 105 that are suitable for joining by apparatus 101. Moreover, apparatus 101 may be used to join more than two members (e.g., members 103 and 105) into an assembly. Furthermore, a plurality of apparatuses (e.g., a plurality of apparatuses 101) may be utilized to join a first member (e.g., first member 103) and a second member (e.g., 105) to form an assembly according to the present invention, as will be described in greater detail below.

Referring to FIGS. 1-3, which depict side, top, and bottom views of assembly 107, respectively, apparatus 101 comprises an adhesive layer 109 bonded to lower surface 111 of first member 103 and to upper surface 113 of second member 105. Adhesive layer 109 transfers shear loads between first member 103 and second member 105. Apparatus 101 further comprises a fastener 115 that, in this particular embodiment, comprises a pin 117 extending through first member 103, adhesive layer 109, and second member 105, a head 119 extending from pin 117, and a nut 121 threadedly engaged with pin 117. In the illustrated embodiment, apparatus 101 further comprises a first biasing element 123 disposed between head 119 and an upper surface 125 of first member 103 and a second biasing element 127 disposed between nut 121 and a lower surface 129 of second member 105. In other embodiments, only one biasing element 123 or 127 is utilized. Preferably, if only one biasing element is used, the biasing element is disposed proximate the thinner of the members being joined. Pin 117 extends through biasing elements 123 and 127.

In this particular embodiment, biasing elements 123 and 127 comprise cupped or Belleville washers; however, other biasing elements exist and are within the scope of the present invention, as will be discussed in greater detail below. It should be noted that, in various embodiments, biasing element 123 or biasing element 127 may be omitted. It should also be noted that FIGS. 1-3 depict apparatus 101 in an uncompressed state. Apparatus 101 is compressed to complete assembly 107 for service, as will be discussed in greater detail below. It should also be noted that fastener 115 may take on many forms other than the particular form depicted in FIGS. 1-3, as will also be discussed in greater detail below.

FIG. 4 depicts a cross-sectional view of assembly 107 taken along a line 4-4 in FIG. 2. First member 103, second member 105, and adhesive layer 109 define a fastener opening 401 in which fastener 115 is disposed. Fastener opening 401 is formed by openings 403, 405, 407 defined by first member 103, adhesive layer 109, and second member 105, respectively. In the illustrated embodiment, fastener opening 401 exhibits a diameter $D_o$ that is greater than a diameter $D_p$ of pin 117. It should be noted that, in some embodiments, openings 403, 405, 407 are misaligned and may exhibit different diameters. If openings 403, 405, 407 exhibit different diameters, preferably at least one of openings 403, 405, 407 exhibits a diameter (e.g., diameter $D_o$) larger than diameter $D_p$ of pin 117. Such a configuration provides flexibility at assembly and reduced manufacturing costs by allowing in-plane mismatch of members 103 and 105. Match-drill assembly tooling is eliminated, as members 103 and 105 can be drilled separately to form fastener opening 401. Moreover, such a configuration at least partially isolates fastener 115 from a fatigue load spectrum during use. Other means for joining first member 103 and second member 105, however, accomplish fatigue load spectrum isolation without relying upon fastener and fastener opening diameter sizes, as will be discussed in greater detail below.

Figure 6:
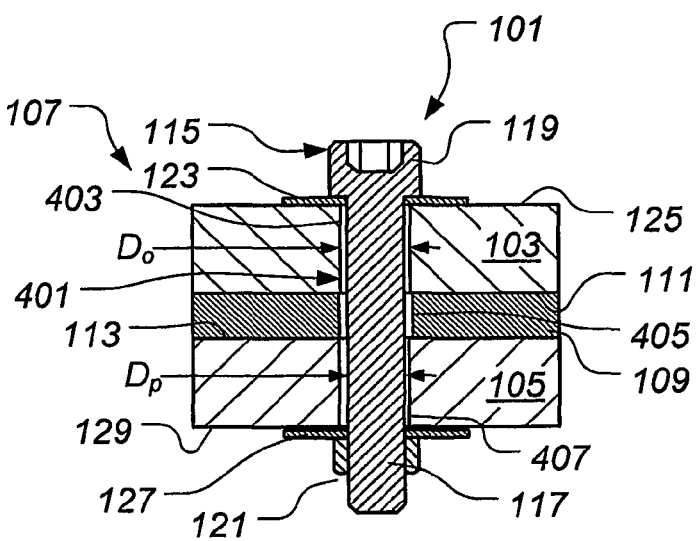
FIG. 6 is a cross-sectional view, corresponding to the view of FIG. 4, illustrating the apparatus for joining the members of the assembly in the compressed state.

As noted above, apparatus 101 is compressed to complete assembly 107 for service. FIG. 5 depicts a side view of assembly 107 and FIG. 6 depicts a cross-sectional view, corresponding to the view of FIG. 4, of assembly 107 in which apparatus 101 is in a compressed state. Specifically, nut 121 has been advanced along a threaded portion 501 of pin 117 to urge first member 103 toward second member 105 and to flatten first biasing element 123 and second biasing element 127. First biasing element 123 and second biasing element 127 further bias first member 103 toward second member 105 It should be noted that fastener 115 is but one example of a means for joining first member 103 and second member 105. Moreover, biasing elements 123, 127 are merely examples of a means for providing a compression preload to adhesive layer 109.

In preferred embodiments, adhesive layer 109 comprises a compliant adhesive, i.e., an adhesive that exhibits high strain to failure characteristics. The degree to which adhesive can be strained prior to failure is implementation specific, however. In some implementations, the degree of desired compliancy is greater than in other implementations, depending at least in part upon the thickness of adhesive layer 109 and the loads experienced by assembly 107. As will be discussed in greater detail below, adhesive layer 109 may include zones of greater compliancy (e.g., lower shear modulus) and other zones of lesser compliancy (e.g., higher shear modulus). In such embodiments, at higher static loads, adhesive layer 109 strains without failing (e.g., tearing, shearing, or the like), thus allowing pin 117 to contact first member 103 and/or second member 105 and share the joint load through bearing and shear. Such a configuration provides enhanced ultimate static strengths over conventional fastened joints.

Figure 7:
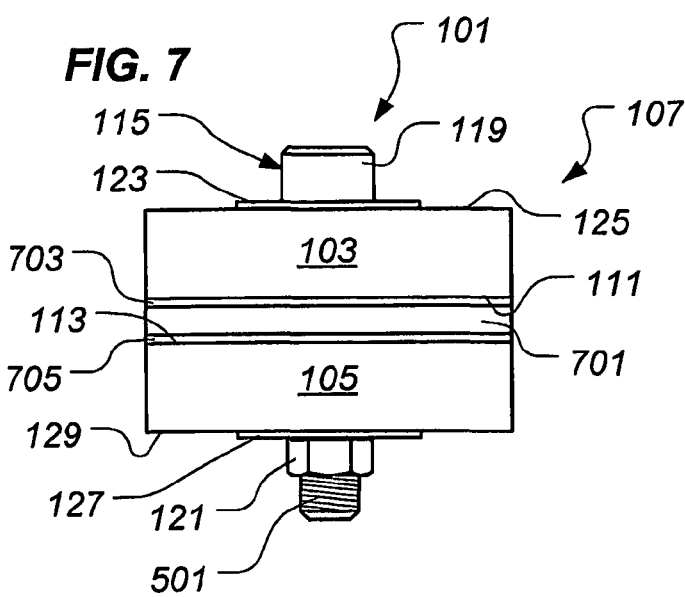
FIG. 7 is a side, elevational view of the assembly of FIG. 1 illustrating an embodiment of a shear transfer layer of the assembly alternative to that of FIG. 1.

Examples of such compliant adhesives include, but are not limited to, FM-300 film adhesive from Cytec Engineered Materials of Anaheim, Calif.; AF-163 film adhesive from 3M Corporation of St. Paul, Minn.; Magnabond M-6398 paste adhesive from Magnolia Plastics, Inc. of Chamblee, Ga.; Hysol EC-3448 paste adhesive from 3M Corporation; and EA-9346.3 paste adhesive from Henkel Corporation of Bay Point, Calif. Alternatively, as depicted in FIG. 7, adhesive layer 109 may be replaced by a shear transfer layer 701, comprising, for example, an elastomer, adhesively bonded to lower surface 111 of first member 103 and upper surface 113 of second member 105 by adhesive layers 703 and 705. In preferred embodiments, adhesive layers 703, 705 comprise a compliant adhesive, such as the compliant adhesives disclosed above for adhesive layer 109; however, other adhesives may be employed and are encompassed in the scope of the present invention. Whether shear transfer adhesive layer 109 or the combination of shear transfer layer 701 with adhesive layers 703, 705 are used, shear transfer adhesive layer 109 and the combination of shear transfer layer 701 with adhesive layers 703, 705 each form a shear transfer member disposed between and bonded to first member 103 and second member 105. Such a shear transfer member is but one example of a means for transferring shear loads between first member 103 and second member 105.

Figure 8:
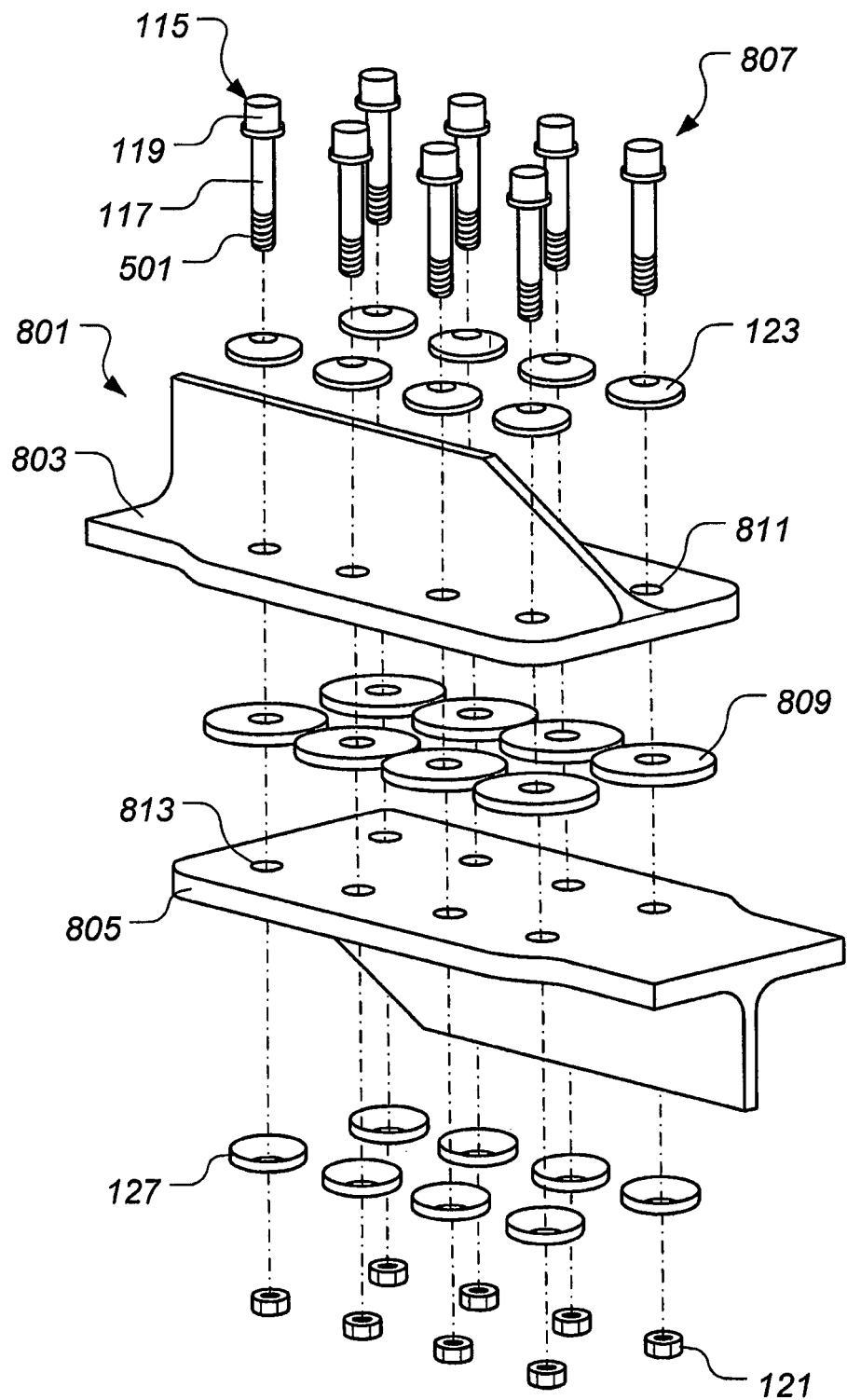
FIG. 8 is an exploded, perspective view of a second embodiment of an assembly according to the present invention.

As discussed above, an assembly according to the present invention may include a plurality of fasteners, such as fasteners 115. Moreover, a shear transfer member disposed between a first member and a second member and bonded to the first member and the second member may take on the form of a plurality of elements disposed about the fasteners. Such an embodiment is depicted in FIG. 8. Specifically, an assembly 801 comprises a first member 803, a second member 805, and an apparatus 807 for joining first member 803 and second member 805. In the illustrated embodiment, apparatus 807 comprises a plurality of fasteners 115 and corresponding pluralities of first biasing elements 123, shear transfer members 809, and second biasing elements 127. Note that only one fastener 115, one first biasing element 123, one shear transfer member 809 and one second biasing element 127 are labeled in FIG. 8 for clarity.

Pin 117 (only one labeled for clarity) of each of fasteners 115 is disposed through a corresponding first biasing element 123, an opening 811 defined by first member 803, a shear transfer member 809, an opening 813 defined by second member 805, and second biasing element 127. In the illustrated embodiment, nuts 121 (only one labeled for clarity) are advanced along threaded portions 501 (only one labeled for clarity) of pin 117 to urge first member 803 toward second member 805, thus joining first member 803 and second member 805. Biasing elements 123, 127 further urge first member 803 toward second member 805, providing a compression preload to shear transfer members 809. In various embodiments, shear transfer members 809 may comprise a compliant adhesive, such as in adhesive layer 109, or may comprise a shear transfer layer, such as shear transfer layer 701, bonded to members 803, 805 by adhesive layers, such as adhesive layers 703, 705. It should also be noted that shear transfer members 809 may exhibit the same degree of compliancy or different degrees of compliancy. Shear transfer members 809 transfer shear loads between first member 803 and second member 805.

Preferably, shear transfer members 809 disposed proximate ends and/or edges of assemblies are more compliant (e.g., exhibit lower shear moduli) than shear transfer members 809 disposed more distal from ends and/or edges of assemblies. For example, shear transfer members 809 disposed proximate an end 815 of first member 803 and/or proximate an end 817 of second member 805 preferably are less stiff (e.g., have greater compliance and lower shear moduli) than other shear transfer members 809 depicted in FIG. 8. Such a configuration aids in accommodating higher peak loads exhibited at ends and/or edges of such assemblies that otherwise would result in peel failure of an adhesive bond between conventionally joined members.

Figure 9:
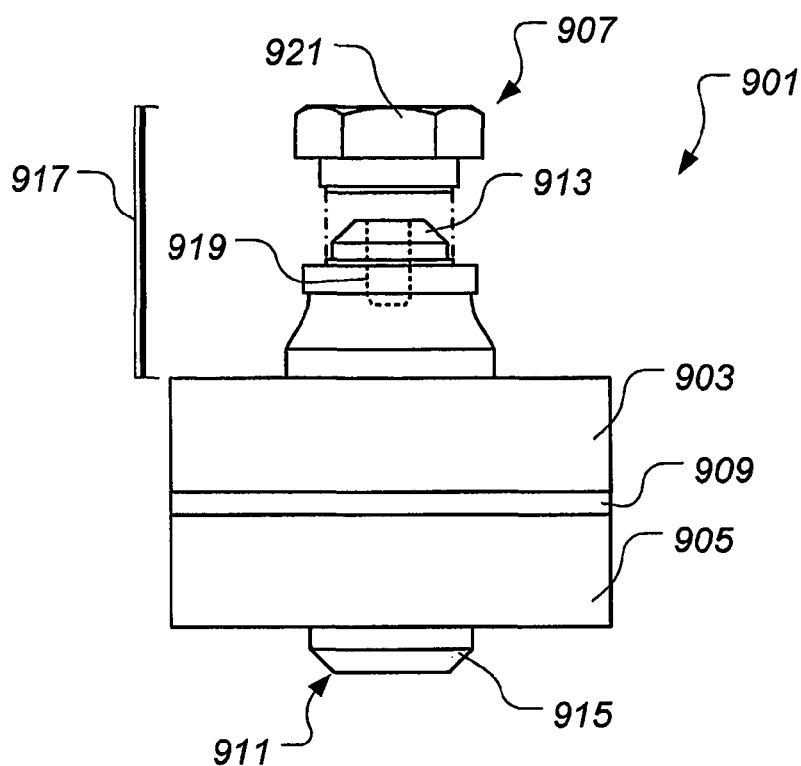
FIG. 9 is side, elevational view illustrating one particular embodiment of a fastener of an apparatus according to the present invention for joining members alternative to that of FIG. 1.

As noted above, the particular form of fasteners used in various embodiments of apparatuses according to the present invention for joining members is not limited to the form illustrated in FIGS. 1-8. Rather, any suitable fastener may be employed. For example, as shown in FIG. 9, an assembly 901 according to the present invention comprises a first member 903, a second member 905, and an apparatus 907 for joining members 903 and 905. In the illustrated embodiment, apparatus 907 comprises a shear transfer member 909, disposed between and bonded to members 903, 905, and a fastener 911 extending through members 903, 905, and 909. Shear transfer member 909 may comprise a compliant adhesive (such as in adhesive layer 109) or may comprise a shear transfer layer (such as shear transfer layer 701). Fastener 911 comprises a pin 913, a head 915, and a collar 917 threadedly engaged with pin 913.

A retention tool (not shown) is engaged with a fitting 919 defined by pin 913. A drive tool (not shown) is engaged with collar 917 and is used to rotate collar 917 with respect to pin 913 while retention tool inhibits pin 913 from rotating to urge members 903, 905 toward one another. Note that retention tool and drive tool may be combined into a single tool. In the illustrated embodiment, a drive portion 921 of collar 917 is designed to shear or break away from collar 917 at a predetermined torque. In other embodiments, collar 917 remains intact after being advanced along pin 913. Note that first biasing element 123 and/or second biasing element 127 (each shown in at least FIG. 1) may be included in apparatus 907 between head 915 and second member 905 and between collar 917 and first member 903, respectively.

Figure 10:
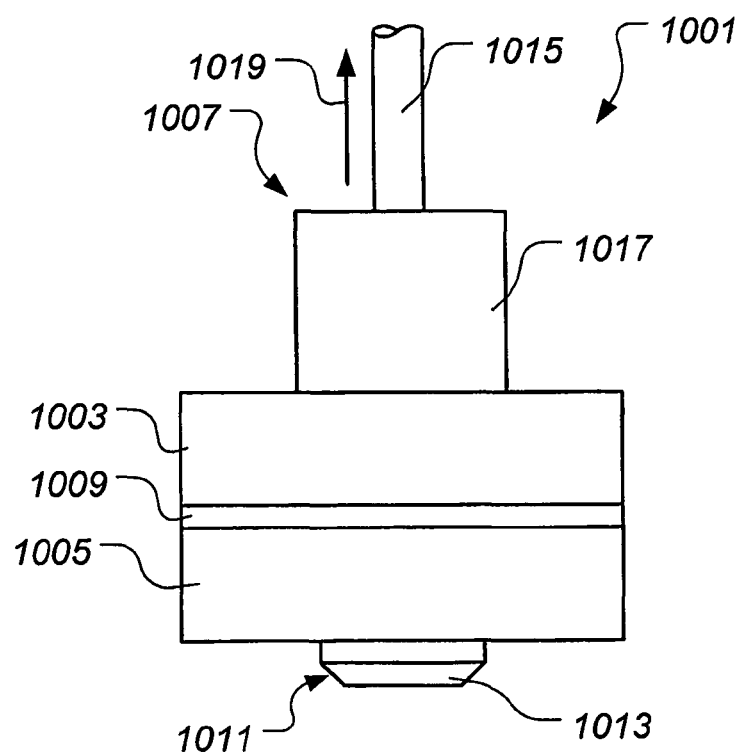
FIG. 10 is a side, elevational view illustrating another particular embodiment of a fastener of an apparatus according to the present invention for joining members alternative to that of FIG. 1.

In another embodiment, shown in FIG. 10, an assembly 1001 according to the present invention comprises a first member 1003, a second member 1005, and an apparatus 1007 for joining members 1003 and 1005. In the illustrated embodiment, apparatus 1007 comprises a shear transfer member 1009, disposed between and bonded to members 1003, 1005, and a fastener 1011 extending through members 1003, 1005, and 1009. Shear transfer member 1009 may comprise a compliant adhesive (such as in adhesive layer 109) or may comprise a shear transfer layer (such as shear transfer layer 701). Fastener 1011 comprises a head 1013, a cable 1015 extending from head 1013, and a collar 1017 engaged with cable 1015. A tool (not shown) is engaged with cable 1015 and urged in a direction indicated generally by an arrow 1019 with respect to collar 1017 to urge first member 1003 toward second member 1005. Collar 1017 engages cable 1015 to retain cable 1015 in position relative to collar 1017. Cable 1015 preferably comprises a stranded cable and may be trimmed generally flush with collar 1017.

Other fastener forms, however, may be employed in the present invention. For example, fasteners comprising metallic, fibrous, and/or composite materials may be used. Examples of composite fasteners include, but are not limited to, fasteners comprising aluminum; steel; titanium; dry, woven carbon or graphite fibers; carbon or graphite fibers disposed in a compliant matrix, such as an elastomeric matrix; carbon or graphite/epoxy composite material; or the like. Fasteners employing cables may retain the cables by friction (as in the embodiment of FIG. 10) or by splaying the cable and introducing a material about the splayed cable fibers to retain the splayed cable fibers in a splayed configuration. If the particular fastener employed is flexible to some degree, a larger fastener opening (e.g., fastener opening 401) is not required, as the flexible fastener will elastically deform in response to loads placed upon the assembly. Moreover, while the fasteners (e.g., fasteners 115, 911, and the like) illustrated in the drawings and described herein include nuts or collars that are threadedly engaged with pins, fasteners employing other mechanical engagements may be used in the present invention.

The particular forms of biasing elements of the present invention are not limited to the forms discussed above and illustrated in FIGS. 1-8. Rather, biasing elements of the present invention may take on any form suitable for use in biasing a plurality of members toward one another. For example, as shown in FIGS. 11-13, an assembly 1101 according to the present invention comprises first member 103, second member 105, and apparatus 1103 for joining members 103, 105. Apparatus 1103 comprises a shear transfer member 1105 disposed between and bonded to first member 103 and second member 105. Shear transfer member 1105 may comprise a compliant adhesive (such as in adhesive layer 109) or may comprise a shear transfer layer (such as shear transfer layer 701). Apparatus further includes fastener 115 extending through members 103, 105, and 1105. In the illustrated embodiment, a biasing element 1107 is disposed between head 119 of fastener 115 and first member 103. Biasing element 1107 is bowed in one direction, as best seen by comparing FIGS. 12 and 13, and is generally rectangular in a plan view, as shown in FIG. 11. Other aspects of assembly 1101 generally correspond to the aspects of assembly 101, shown in FIGS. 1-7. It should be noted, however, that a second biasing element 1107 may be disposed between nut 121 and second member 105. Alternatively, biasing element 1107 may be disposed between nut 121 and second member 103, rather than between head 119 and first member 103. In some embodiments, biasing elements (e.g., biasing element 1107) are configured to achieve a substantially uniform compression force along their perimeters. Biasing elements of the present invention may be bowed in one direction or in more than one direction.

Figure 14:
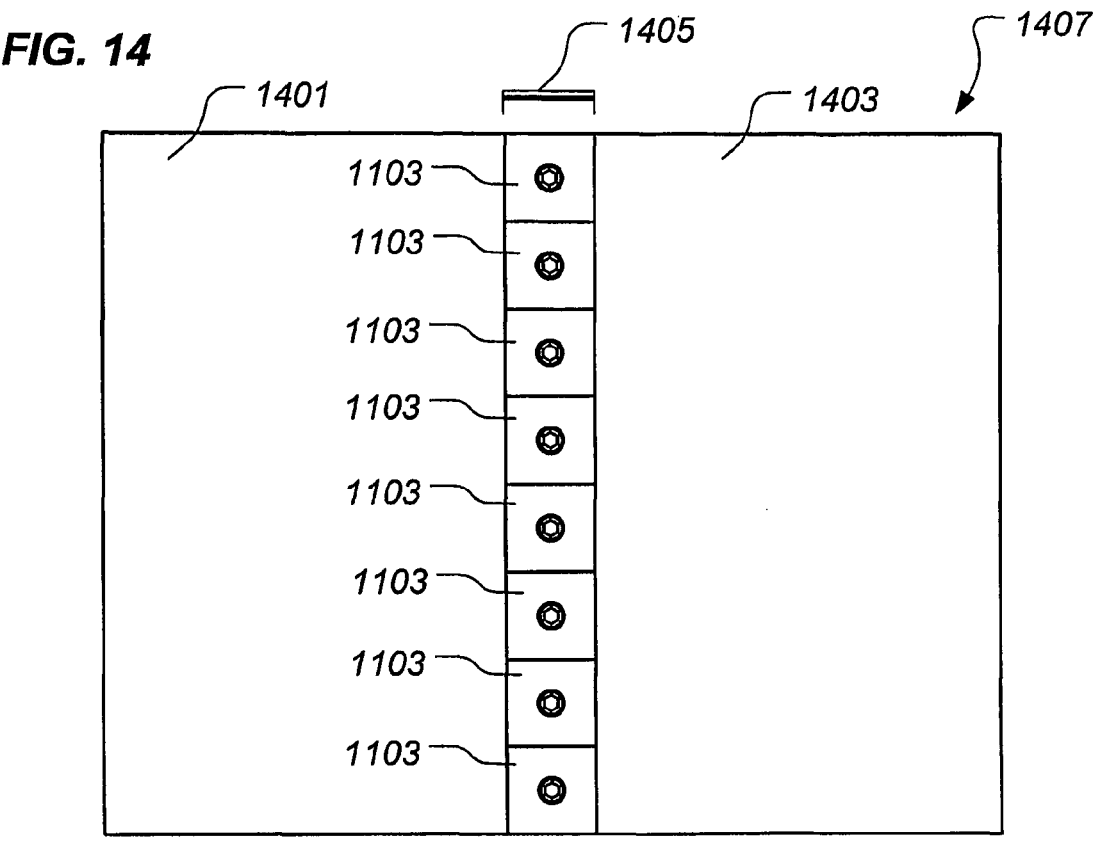
FIG. 14 is a top, plan view of an illustrative embodiment of a lap joint assembly according to the present invention.
Figure 15:
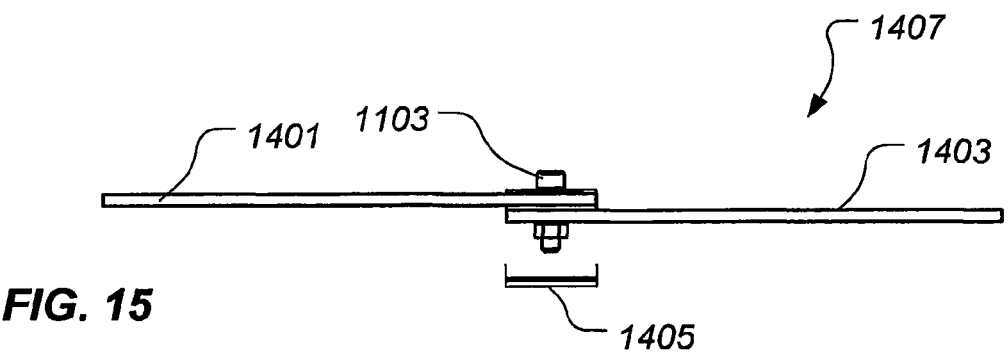
FIG. 15 is a side, elevational view of the lap joint assembly of FIG. 14.

The apparatus according to the present invention for joining members is particularly useful when joining a first member and a second member along a lap joint. For example, as shown in FIGS. 14 and 15, a plurality of apparatuses 1103 (shown in detail in FIGS. 11-13) are used to join a first member 1401 and a second member 1403 along a lap joint 1405 to form assembly 1407. In the illustrated embodiment, apparatuses 1103 include separate shear transfer members 1105 for each apparatus 1103. The scope of the present invention, however, is not so limited. Rather, a single shear transfer member may extend under all of biasing elements 1107. Alternatively, a shear transfer member may extend under some biasing elements 1107 while another shear transfer member extends under the remaining biasing elements 1107. It should be noted that, if a plurality of shear transfer members exist, one or more of the shear transfer members may exhibit compliancies that are different from other shear transfer members. For example, shear transfer members proximate edges of members 1401, 1403 may exhibit greater compliancies than shear transfer members that are more distal from the edges of members 1401, 1403. It should also be noted that two or more of the biasing elements 1107 (shown in FIGS. 11-13) employed in assembly 1401 may be unitized into a single biasing element. Moreover, one or more apparatuses 1103 illustrated in FIGS. 14 and 15 may be replaced with another embodiment of an apparatus for joining members 1401 and 1403, as disclosed herein and their equivalents.

Figure 16:
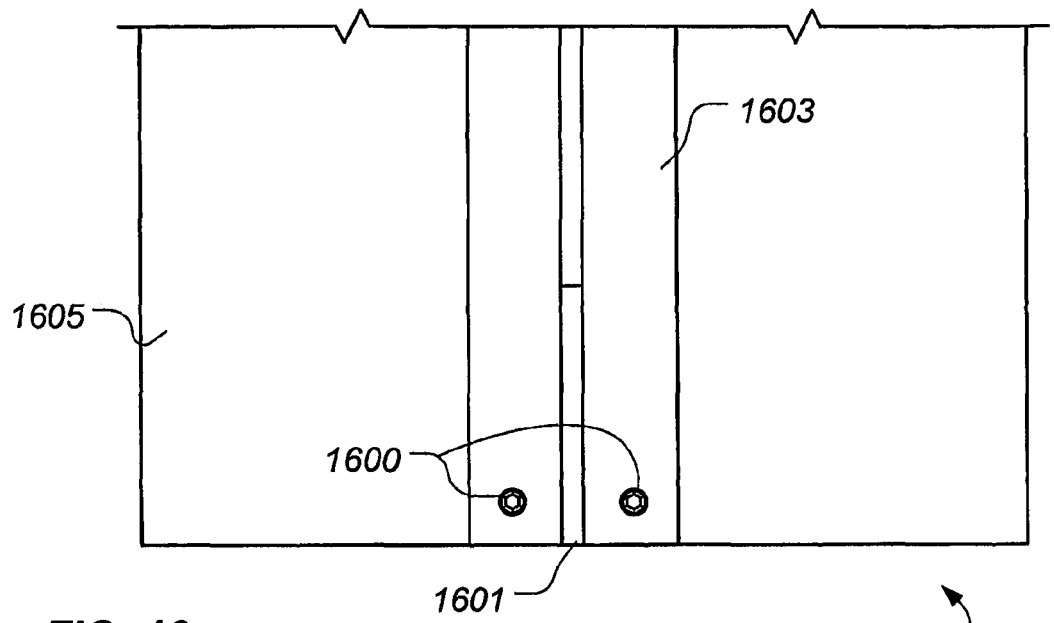
FIG. 16 is a top, plan view of an illustrative embodiment of a skin-stiffener assembly according to the present invention.
Figure 17:
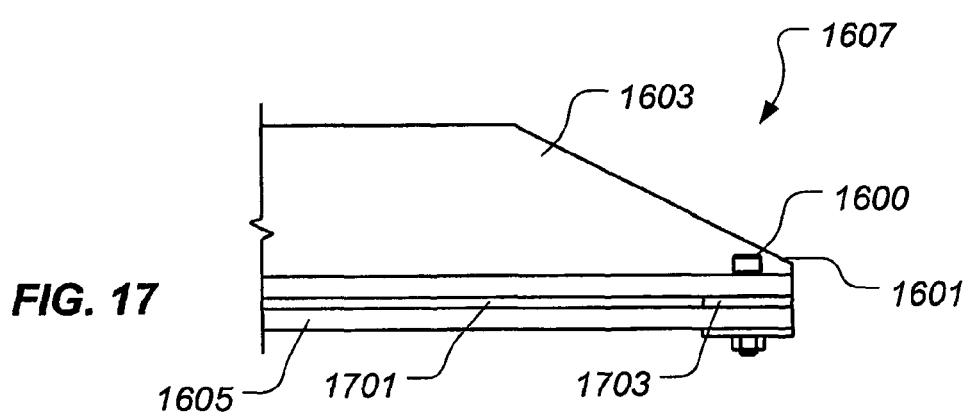
FIG. 17 is a side, elevational view of the skin-stiffener assembly of FIG. 16.
Figure 18:
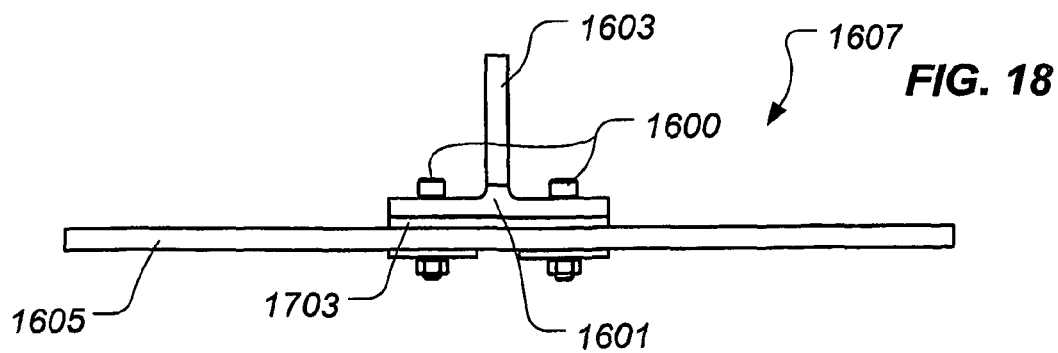
FIG. 18 is an end, elevational view of the skin-stiffener assembly of FIG. 16.

The apparatus according to the present invention for joining members is particularly useful for joining a stiffener to a skin. For example, as shown in FIGS. 16-18, an apparatus 1600 are used to join an end 1601 of a stiffener 1603 to a skin 1605 to form a panel assembly 1607 to counteract peel stresses proximate end 1601 that are induced during use. In the illustrated embodiment, stiffener 1603 is adhesively bonded to skin 1605 by adhesive layer 1701. Preferably, adhesive layer 1701 comprises a compliant adhesive, such as discussed above. Generally, apparatus 1600 corresponds to two apparatuses 1103 (shown in detail in FIGS. 11-13), except that apparatus 1600 includes a single shear transfer member 1703. The scope of the present invention, however, is not so limited. Rather, apparatus 1600 may include separate shear transfer members. It should be noted that, if multiple shear transfer members exist, the shear transfer members may exhibit different compliancies from one another. It should also be noted that adhesive layer 1701 may exhibit a compliancy that is different from one or both of shear transfer members 1105. Preferably, the compliancy of shear transfer members 1105 is greater than the compliancy of adhesive layer 1701. In other words, the shear moduli exhibited by shear transfer members is less than the shear modulus exhibited by adhesive layer 1701. Moreover, apparatus 1600 may be replaced with one or more other embodiments of an apparatus according to the present invention for joining stiffener 1603 and skin 1605.

It should be noted that the shear transfer members (e.g., adhesive layer 109; shear transfer layers 701; adhesive layers 703, 705; shear transfer members 809, 909, 1009, 1105, 1703; or the like) may include fiber reinforcement. For example, shear transfer members 809 preferably include radially-oriented fibers, which enhance creep resistance of shear transfer members 809. It should also be noted that the shear transfer members, irrespective of their forms, can be tailored to exhibit particular desired shear moduli by preferentially orienting reinforcing fibers within the shear transfer members.

Figure 19:
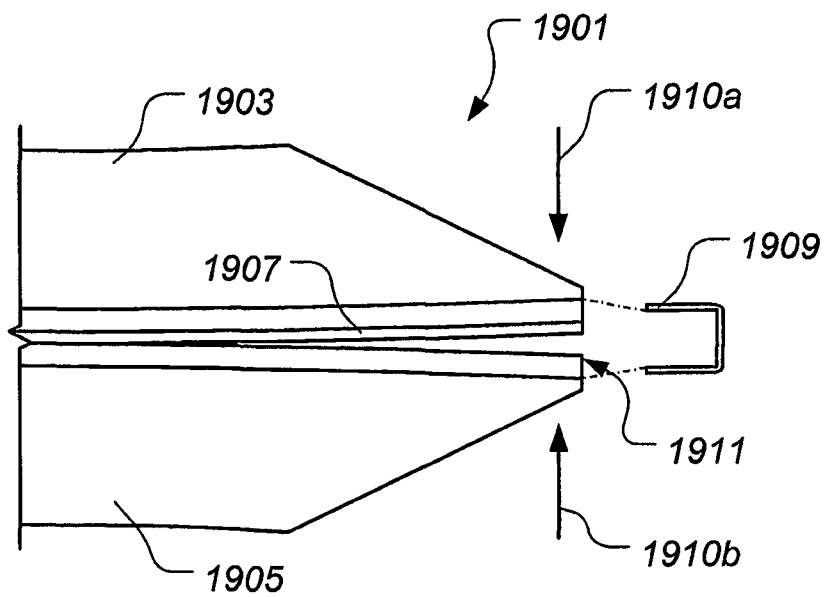
FIG. 19 is a side, elevational view of a first illustrative embodiment of a clip-joined assembly according to the present invention in a disjoined state.
Figure 20:
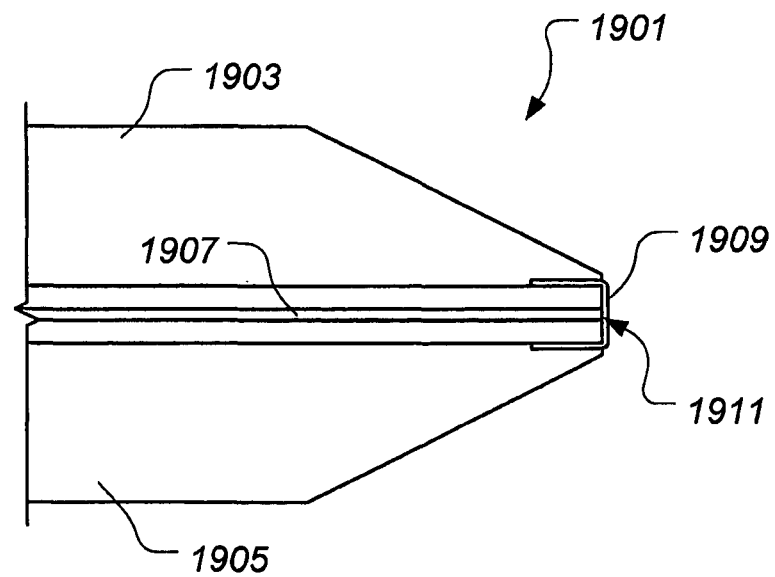
FIG. 20 is a side, elevational view of the clip-joined assembly of FIG. 19 in a joined state.

In some embodiments of the present invention, the joined members themselves provide a means for providing a compression preload to a means for transferring shear loads between the joined members. For example, as depicted in FIGS. 19 and 20, an assembly 1901 comprises a first member 1903, a second member 1905, a shear transfer layer 1907 disposed between and engaged with first member 1903 and second member 1905, and a clip 1909. In the disjoined state, shown in FIG. 19, members 1903, 1905 longitudinally bow or are deformed away from one another. When joined, as shown in FIG. 20, members 1903, 1905 are urged toward one another (as indicated by arrows 1910*a*, 1910*b*) to remove the deformation or bow and provide a compressive preload to shear transfer layer 1907. In the illustrated embodiment, clip 1909 is applied to members 1903, 1095 to join members 1903, 1905. It should be noted that shear transfer layer 1907 may be replaced with any of the shear transfer member or feature embodiments disclosed herein. It should also be noted that only one of members 1903, 1905 may provide the compressive preload to shear transfer layer 1907. In such an embodiment, only one of members 1903, 1905 is bowed with respect to the other of members 1903, 1905.

Figure 21:
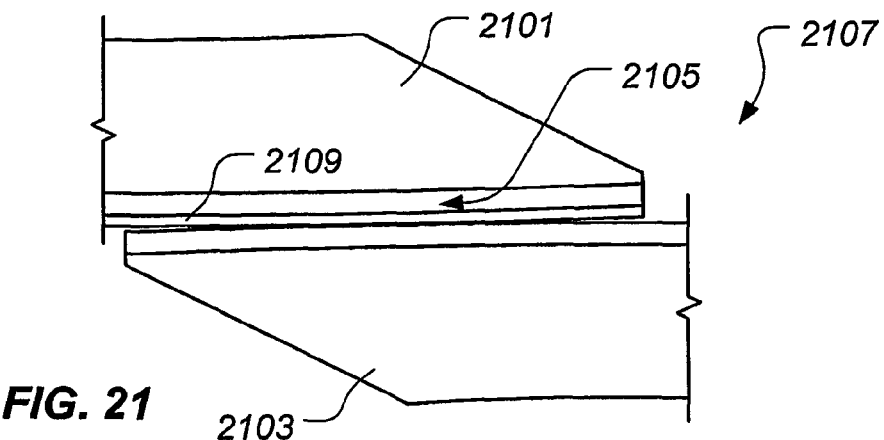
FIG. 21 is a side, elevational view of a second illustrative embodiment of a clip-joined assembly according to the present invention depicted in a disjoined state.
Figure 22:
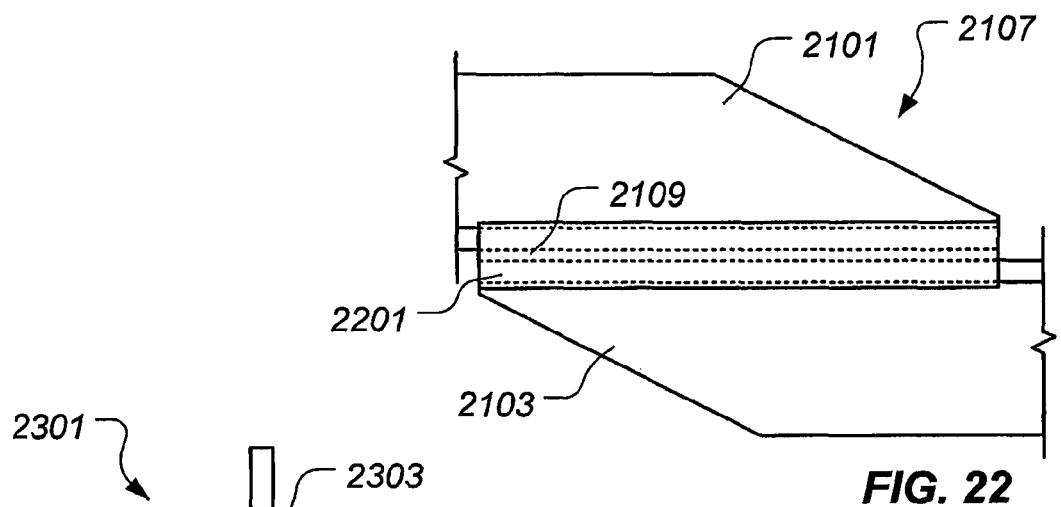
FIG. 22 is a side, elevational view of the clip-joined assembly of FIG. 21 depicted in a joined state.

In the embodiment of FIGS. 19 and 20, clip 1907 is applied to an end 1911 of assembly 1901. The embodiment of FIGS. 21 and 22 operates similarly, except that a clip 2201 is used to join a first member 2101 and a second member 2103 along an edge 2105 to form an assembly 2107. Members 2101 and 2103 provide a compressive preload to a shear transfer layer 2109 disposed between and engaged with members 2101, 2103.

Figure 23:
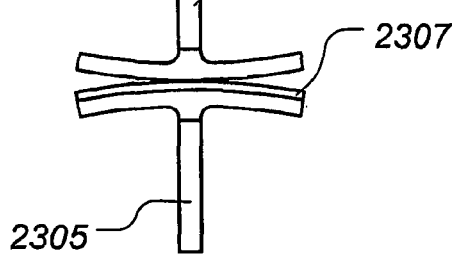
FIG. 23 is an end, elevational view of a third illustrative embodiment of a clip-joined assembly according to the present invention depicted in a disjoined state.
Figure 24:
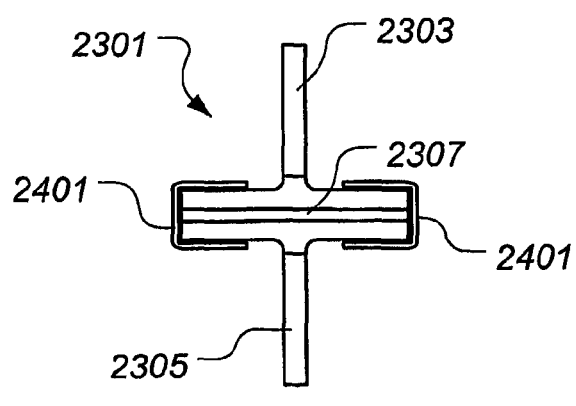
FIG. 24 is an end, elevational view of the clip-joined assembly of FIG. 23 depicted in a joined state.

Members to be joined may also be transversely bowed with respect to one another to provide a compressive preload to a shear transfer layer. For example, as shown in FIGS. 23 and 24, an assembly 2301 comprises a first member 2303, a second member 2305, a shear transfer layer 2307, and a plurality of clips 2401. In the disjoined state, shown in FIG. 23, members 2303, 2305 transversely bow or are deformed away from one another. When joined, as shown in FIG. 24, members 2303, 2305 are urged toward one another to remove the deformation or bow and provide a compressive preload to shear transfer layer 2307. In the illustrated embodiment, clip 2401 is applied to members 2303, 2305 to join members 2303, 2305. It should be noted that shear transfer layer 2307 may be replaced with any of the shear transfer member or feature embodiments disclosed herein. It should also be noted that only one of members 2303, 2305 may provide the compressive preload to shear transfer layer 2307. In such an embodiment, only one of members 2303, 2305 is bowed with respect to the other of members 2303, 2305.

Figure 25:
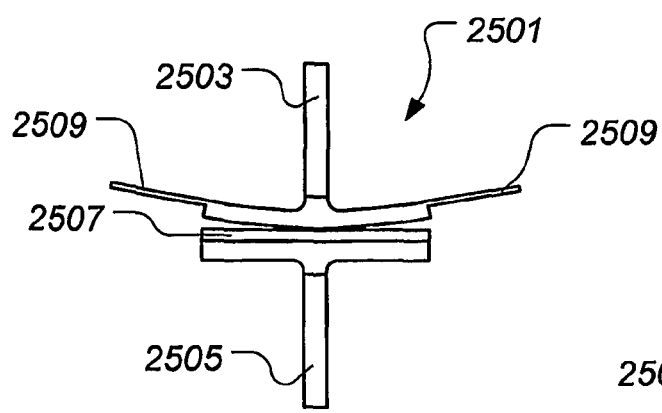
FIG. 25 is an end, elevational view of a fourth illustrative embodiment of a clip-joined assembly according to the present invention depicted in a disjoined state.
Figure 26:
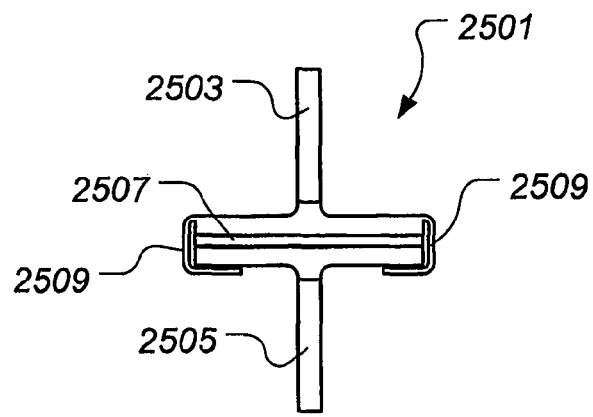
FIG. 26 is the clip-joined assembly of FIG. 25 depicted in a joined state.

Embodiments of the present invention exist in which fastening elements comprise part of one or both of the joined members. For example, as shown in FIGS. 25 and 26, an assembly 2501 comprises a first member 2503, a second member 2505, a shear transfer layer 2507, and a plurality of fastening elements 2509 extending from first member 2503. Alternatively, fastening elements 2509 may extend from second member 2505 or from both members 2503, 2505. In the disjoined state, shown in FIG. 25, members 2503, 2505 transversely bow or are deformed away from one another. In other embodiments, however, members 2503, 2505 may longitudinally bow away from one another, in a fashion similar to that of FIG. 19 or 21. When joined, as shown in FIG. 26, members 2503, 2505 are urged toward one another to remove the deformation or bow and provide a compressive preload to shear transfer layer 2507. In the illustrated embodiment, fastening element 2509 is bent about second member 2505 to join members 2503, 2505. It should be noted that shear transfer layer 2507 may be replaced with any of the shear transfer member or feature embodiments disclosed herein. It should also be noted that only one of members 2503, 2505 may provide the compressive preload to shear transfer layer 2507. In such an embodiment, only one of members 2503, 2505 is bowed with respect to the other of members 2503, 2505.

Figure 27:
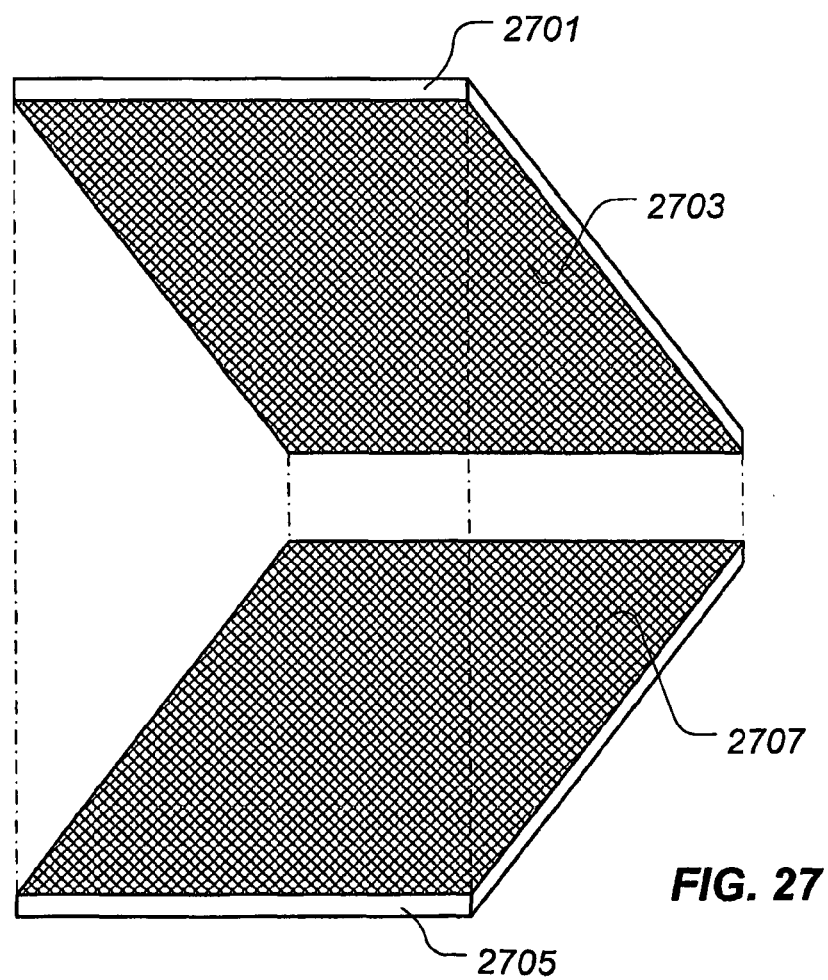
FIG. 27 is a stylized, exploded, perspective view illustrating an embodiment of a shear transfer feature according to the present invention.

While the present invention has been discussed above as including a shear transfer layer or member, the scope of the present invention is not so limited. Rather, the joined members may include one or more features that transmit shear loads between the members. For example, as depicted in FIG. 27, a first member 2701 includes a knurled surface 2703 and a second member 2705 includes a knurled surface 2707. When knurled surfaces 2703, 2707 are mated and members 2701, 2703 are joined (such as by any other the joining techniques disclosed herein), knurled surfaces 2703, 2707 mechanically engage one another to transfer shear loads between members 2701, 2703 when in service. Knurled surfaces (e.g., knurled surfaces 2703, 2707) or other such mechanical interlocks replace the shear transfer layers, members, or elements disclosed in any of the above embodiments.

It should be noted that an assembly according to the present invention may include more than two members. Each joint of such assemblies may be tailored to balance the load transfer through the assembly by, for example, employing shear transfer elements or features having different shear transfer characteristics. For example, one joint of an assembly may include a shear transfer layer, member, or plurality of layers and/or members having a particular shear modulus or a particular plurality of shear moduli, while another joint of the assembly includes a shear transfer layer, member, and/or plurality of layers or members having a different particular shear modulus or a different plurality of shear moduli.

It should be noted that the term "shear load transfer structure," as used herein, encompasses any of the means for transferring shear loads between members, shear load transfer layers, members, elements, features, or the like disclosed herein and their equivalents, including, but not limited to, adhesive layers, adhesively bonded shear load transfer layers, mechanical interlocking features of joined members, and the like. It should also be noted that the tem "compression preload feature," as used herein, encompasses any of the means for providing a compression preload, biasing elements, bows or deformations of members, or the like disclosed herein or their equivalents.

The present invention provides significant advantages, including: (1) providing lightweight structural assemblies with enhanced strength and reliability; (2) flexibility at assembly; (3) allowance for in-plane mismatch of structural components while the selection of thickness and stiffness of the shear transfer members permit gap and angular mismatch of structural components while retaining the original overall joint stiffness, resulting in consistent joint performance with reduced assembly time and manufacturing costs; and (4) improvements in static and fatigued performance with a weight and cost savings over conventional bolted joints with machined step structure or conventional bonded joints.

Other significant advantages of the present invention exist. The most attractive is the significant cost reduction and cycle time reduction resulting from eliminating match drill assembly tooling and process steps. This is made possible by the loose tolerance fastener holes, which can be drilled at the detail level. The implementation of this invention would have a significant impact on the cost of rate tooling and could reduce the number of assembly fixtures required to achieve "rate" or meet customer demand. It would reduce the capital expense required to employ robotics for assembly of composite joints. A significant related benefit would be the reduction in the number of manufacturing discrepancies or material reviews related to drilling during the assembly process. This invention is also an enabling technology for toolless or jigless assembly.

This invention allows both the fasteners and bond line to work together in providing a clear easily-inspected visual indication of overload before catastrophic failure occurs.

It also enables the replacement of fasteners in the field without drilling or installing oversize fasteners. It has the potential of enhancing the survivability response of composite structures by spreading partial failure and absorbing higher levels of energy along joint areas.

Enhanced fatigue life is another advantage provided by the loose tolerance fastener holes. Fail-safe joint capability is provided by having two components capable of carrying joint loads, i.e., the adhesive layer (or shear transfer layer in combination with adhesive layers) being the primary load carrying element and the fastener being the secondary load carrying element.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A structural assembly, comprising:
a first structural member having a first upper surface and a first lower surface defining a first thickness therebetween, the first structural member having a first hole;
a second structural member having a second upper surface and a second lower surface defining a second thickness therebetween, the second structural member having a second hole relatively concentric with the first hole;
an adhesive layer having a plurality of zones of varied compliancy, the adhesive layer in bonding contact with the first lower surface and the second upper surface, the adhesive layer being configured to transfer a shear load between the first structural member and the second structural member, the first structural member and the second structural member being permitted to translate with respect to one another, the adhesive layer having a third hole relatively concentric with the first hole and the second hole, the plurality of zones of varied compliancy provide enhanced ultimate static strength;

a mechanical fastener mechanically joining the first structural member and the second structural member, the mechanical fastener having a head, a shank, and a nut;

a void space formed circumferentially along the length of the shank between the shank and each of the first structural member, the second structural member, and the adhesive layer, the shank located within the first hole, the second hole, and the third hole, the diameters of the first hole, the second hole, and the third hole being larger than the diameter of the shank;

a first biasing element and a second biasing element separate from the mechanical faster being located adjacent the first upper surface and the second lower surface respectively, the first biasing element having a first perimeter that defines an outer contact surface between the first biasing element and the first upper surface, the second biasing element having a second perimeter that defines an outer contact surface between the second biasing element and the second lower surface, the first perimeter and the second perimeter being greater than the head and the nut respectively, the first biasing element and the second biasing being configured to create a compression preload in the adhesive layer element at least between the first perimeter and the second perimeter, the compressive force causing the first structural member and the second structural member to urge together, thereby increasing the shear strength of the adhesive layer by compressing the adhesive layer therebetween;

wherein the adhesive layer is configured to selectively allow the shank to share the shear load exhibited upon the first structural member and the second structural member, the shank being configured to experience a reduced fatigue load spectrum when isolated from contact with the first structural member and the second structural member, the shank being configured to share the shear load through bearing and shear when contacted by at least one of the first structural member and the second structural member.

2. The structural assembly according to claim 1, wherein the adhesive layer is formed from an adhesive film.

3. The structural assembly according to claim 1, wherein the adhesive layer is formed from an adhesive paste.

4. The structural assembly according to claim 1, wherein the adhesive layer includes an elastomer.

* * * * *